Oct. 3, 1933.  H. CARPENTER  1,929,304

EGG MARKER AND DATER

Filed Feb. 17, 1932

Hezekiah Carpenter, INVENTOR

BY Victor J. Evans & Co.

ATTORNEY

Patented Oct. 3, 1933

1,929,304

UNITED STATES PATENT OFFICE 1,929,304

EGG MARKER AND DATER

Hezekiah Carpenter, Denver, Colo.

Application February 17, 1932. Serial No. 593,637

2 Claims. (Cl. 101—36)

This invention relates to egg markers, and its general object is to provide an egg dater and marker that is automatic in its action in that it is operated by the eggs while passing through the same.

A further object of the invention is to provide an egg marker and dater that will perform its intended function in an accurate manner, without damaging, breaking, blurring or missing an egg, is simple in construction, inexpensive to manufacture, and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:—

Figure 1:
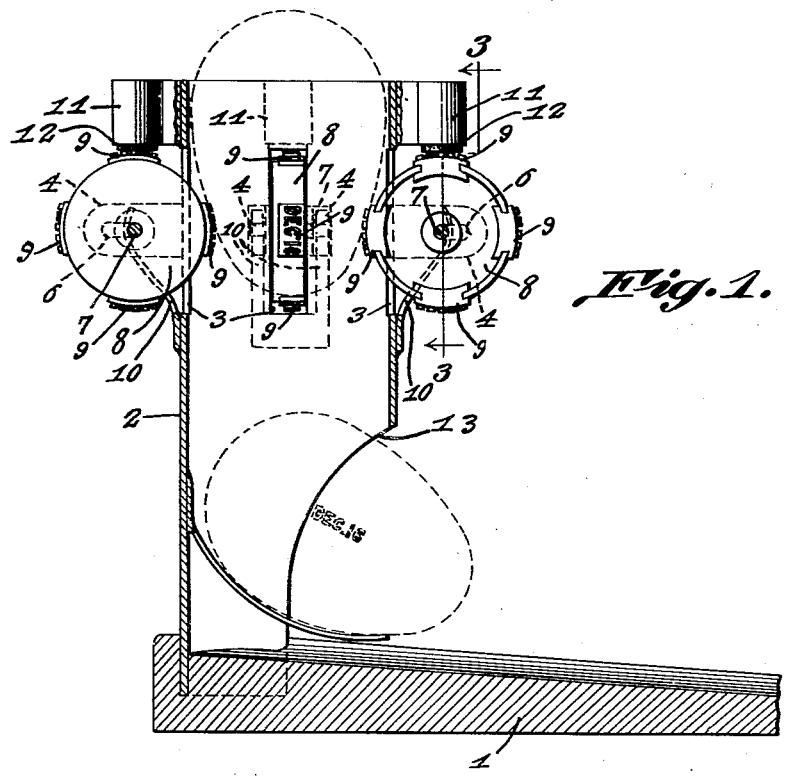
Figure 1 is a longitudinal sectional view taken through the device which forms the subject matter of the present invention.
Figure 2:
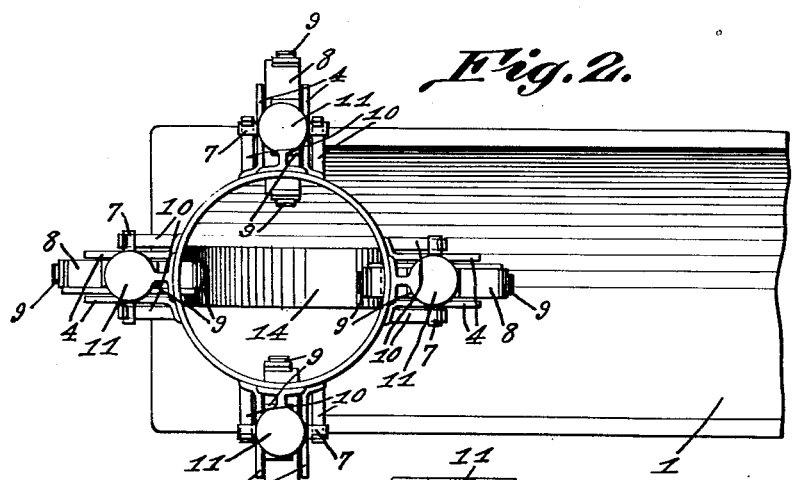
Figure 2 is a top plan view thereof.

Referring to the drawing in detail, the reference numeral 1 indicates the base of my device which as best shown in Figure 1 is provided with an inclined top having a channel groove arranged therein for the purpose of providing a chute.

Figure 3:
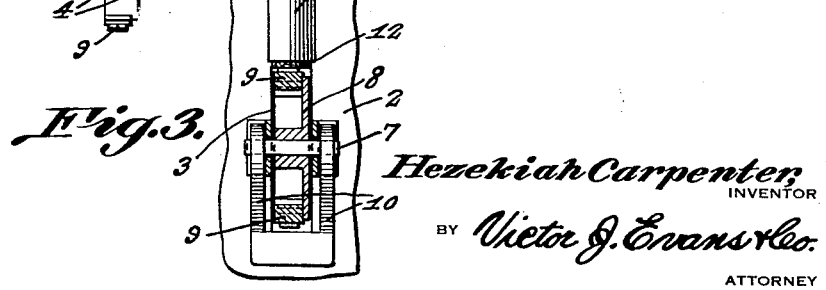
Figure 3 is a sectional view taken approximately on line 3—3 of Figure 1, looking in the direction of the arrows.

Rising from the large end of the base and having its lower end embedded therein is a tubular member 2 of a diameter to receive eggs of various sizes to be passed therethrough and for a purpose which will be presently apparent. In the form as shown, it will be noted that I have provided a plurality of slots 3 in the tubular member and these slots are disposed vertically therein as shown in Figure 1. Extending outwardly from each of the slots and arranged upon opposite sides thereof is a pair of parallel ears 4 having arranged therein slots 6 for the purpose of receiving shafts 7 that extend through disk wheels 8 for rotation thereon. These disk wheels are of a size whereby the peripheries thereof extend through the slots 3, and arranged in the peripheries are openings for the purpose of slidably receiving blocks 9 of type whereby the blocks can be changed from day to day or when desired, as the type may be for the purpose of dating the eggs as shown in Figure 1, or may be a name, sign, mark or the like. By mounting the shaft 7 in the slot 6, it will be apparent that the disk wheels are adjustable so as to mark eggs of various sizes, and to insure positive engagement of the type with the eggs, I provide spring members 10 which are substantially U-shape in configuration with their bight portions secured to the tubular member below the slots 3, while the arms extend upwardly upon opposite sides of the slots 3 for engagement with the ends of the shafts as best shown in Figure 3, so as to urge the type in contacting engagement with the eggs as the latter are passed through the tubular member.

The blocks of type are inked during their rotation and for this purpose I provide a container 11 above each of the slots 3, the containers being cylindrical shape and having disposed therein absorbing material 12 which of course is adapted to receive ink and the absorbing material is arranged in the path of the type upon rotation of the wheel.

The tubular member 2 has arranged therein an outlet opening 13 that is directed toward the chute as best shown in Figure 1, and arranged in the path of the eggs as they are passed through the tubular member 2 is a leaf spring 14 so as to prevent damage or breakage to the eggs as will be apparent, the leaf spring having one of its ends secured to the inner side of the tubular member while its opposite end is arranged slightly above the channel groove of the base.

From the above description and disclosure of the drawing, it will be obvious that I have provided an egg dating and marking device that is automatic in its action, as the eggs are placed in the upper end of the tubular member 2 and by the action of gravity or slight pressure thereon, the eggs are passed between the blocks of type on the disk wheels 8, which will of course result in marking the eggs, and such action will also cause the disk wheels to rotate so as to insure proper inking of the type as well as proper marking of the eggs at all times.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An article marker comprising a base including a chute, a tubular member secured to and rising from said base and having an outlet aligned with the chute, article marking means extending into the tubular member and including adjustably mounted disk wheels, blocks of type interchangeably associated with the disk wheels, inking means for the blocks of type, said article marking means being adapted to be actuated by articles passing through the tubular member and marked thereby simultaneously, and cushioning means for said articles.

2. An egg marker comprising a base including a chute, a tubular member secured to and rising from said chute and having an outlet aligned therewith, said tubular member being provided with slots arranged vertically therein, spaced parallel ears for each slot and extending upon opposite sides thereof, said ears having slots arranged therein, shafts mounted in the slots of the ears, disk wheels secured to the shafts and mounted between the ears, blocks of type interchangeably secured to the disk wheels and moving through the slots of the tubular member to be arranged in the path of eggs passing therethrough, spring means engaging the shafts for urging the type in engagement with the eggs, inking means for the type and arranged in the path thereof upon rotation of the wheels, and a leaf spring arranged in the bottom of the slot and in the path of the eggs to act as a cushioning means therefor.

HEZEKIAH CARPENTER.